United States Patent
Won et al.

(10) Patent No.: US 8,488,503 B2
(45) Date of Patent: Jul. 16, 2013

(54) MAGNETIC FIELD COMMUNICATION METHOD FOR MANAGING NODE WITH LOW POWER CONSUMPTION

(75) Inventors: Yun-Jae Won, Yongin-si (KR); Seung-Ok Lim, Seongnam-si (KR); Sun-Hee Kim, Seongnam-si (KR); Kyu-Sung Hwang, Incheon (KR)

(73) Assignee: Korea Electronics Technology Institute, Seongnam (KR)

( * ) Notice: Subject to any disclaimer, the term of this patent is extended or adjusted under 35 U.S.C. 154(b) by 348 days.

(21) Appl. No.: 12/790,138

(22) Filed: May 28, 2010

(65) Prior Publication Data
US 2011/0243267 A1 Oct. 6, 2011

(30) Foreign Application Priority Data

Mar. 31, 2010 (KR) .................... 10-2010-0029276

(51) Int. Cl.
*G08C 17/04* (2006.01)
*H04J 3/06* (2006.01)
*H04J 3/24* (2006.01)
*H04W 4/00* (2009.01)
*H04L 27/02* (2006.01)
*H04L 27/18* (2006.01)
*H04L 7/04* (2006.01)
*H04B 1/16* (2006.01)

(52) U.S. Cl.
USPC ........... 370/311; 370/338; 370/349; 370/350; 370/509; 370/514; 375/269; 375/279; 375/362; 455/68; 455/343.2; 455/507

(58) Field of Classification Search
USPC .. 370/311, 338, 349, 350, 509, 514; 375/269, 375/279, 362; 455/68, 343.2, 507
See application file for complete search history.

(56) References Cited

U.S. PATENT DOCUMENTS 7,061,427 B2 *   6/2006   Hoffmann et al. ............. 342/367
7,349,493 B2 *   3/2008   Rudkin ........................ 375/322

(Continued)

FOREIGN PATENT DOCUMENTS

KR   1020080053073 A   6/2008
WO   2009/044368 A2   4/2009
WO   2010/018519 A1   2/2010

OTHER PUBLICATIONS

Sun-Hee Kim et al., "Implementation of Air Interface and PHY Layer for Magnetic Field Area Network", Journal of 2009 Summer Academic Conference, IEEK (The Institute of Electronic Engineers of Korea), Jul. 2009, pp. 245-246.*

(Continued)

*Primary Examiner* — Alpus H Hsu
(74) *Attorney, Agent, or Firm* — Sughrue Mion, PLLC (57) ABSTRACT

A magnetic field communication method is provided for managing node with low power consumption which enhances performance and efficiency of a magnetic field area network in the low frequency region. The magnetic field communication method for managing node with low power consumption of the present invention is accomplished in a low-frequency wireless network that is comprised of a MFAN-C and at least one MFAN-N wherein a physical layer is comprised of a preamble, a header, and a payload, and the preamble is comprised of a wake-up sequence and a synchronization sequence. The wake-up sequence is only added to the preamble of the frame that is transmitted from the MFAN-C when the MFAN-N is being activated from the hibernation mode. The wake-up sequence is modulated using ASK modulation, and the synchronization sequence is modulated using BPSK modulation.

5 Claims, 10 Drawing Sheets

U.S. PATENT DOCUMENTS

| | | | | |
|---|---|---|---|---|
| 7,634,020 | B2* | 12/2009 | Batra et al. | 375/295 |
| 2005/0053047 | A1* | 3/2005 | Osterloh et al. | 370/344 |
| 2005/0073944 | A1* | 4/2005 | Rudkin | 370/204 |
| 2007/0103271 | A1* | 5/2007 | King et al. | 340/5.72 |
| 2008/0095126 | A1* | 4/2008 | Mahany et al. | 370/338 |
| 2008/0107157 | A1* | 5/2008 | De Ruijter | 375/134 |
| 2008/0192776 | A1* | 8/2008 | Fleming et al. | 370/514 |
| 2008/0253327 | A1* | 10/2008 | Kohvakka et al. | 370/330 |
| 2009/0109952 | A1* | 4/2009 | Lakkis | 370/349 |
| 2009/0109955 | A1* | 4/2009 | Lakkis | 370/350 |
| 2009/0180524 | A1* | 7/2009 | Wang et al. | 375/149 |
| 2009/0213830 | A1 | 8/2009 | Duesberg et al. | |
| 2009/0238293 | A1 | 9/2009 | Bhatti et al. | |
| 2009/0285240 | A1* | 11/2009 | Zhang et al. | 370/476 |
| 2009/0285241 | A1* | 11/2009 | Zhang et al. | 370/476 |
| 2010/0035629 | A1* | 2/2010 | Soliman | 455/455 |
| 2010/0157907 | A1* | 6/2010 | Taghavi Nasrabadi et al. | 370/328 |
| 2010/0226315 | A1* | 9/2010 | Das et al. | 370/328 |
| 2010/0246543 | A1* | 9/2010 | Rajkotia et al. | 370/338 |
| 2010/0266053 | A1* | 10/2010 | Sakamoto et al. | 375/259 |
| 2011/0179335 | A1* | 7/2011 | Hong et al. | 714/755 |
| 2012/0057486 | A1* | 3/2012 | Abedi et al. | 370/252 |
| 2012/0057506 | A1* | 3/2012 | Kumar | 370/255 |
| 2012/0063389 | A1* | 3/2012 | Abedi | 370/328 |
| 2012/0063397 | A1* | 3/2012 | Abedi et al. | 370/329 |
| 2012/0082036 | A1* | 4/2012 | Abedi et al. | 370/241 |
| 2012/0106397 | A1* | 5/2012 | Abedi | 370/255 |

OTHER PUBLICATIONS

Korean Intellectual Property Office, First Office Action corresponding to KR Patent Application No. 10-2010-0029276, mailed May 17, 2011.

TTA Journal, Introduction of Magnetic Field Communication Technology and Standardization Trend, No. 127, Jan. 2010, pp. 83-88.

Korean Intellectual Property Office, Notice of Reason for Rejection, Final Rejection corresponding to KR Patent Application No. 10-2010-0029276, mailed Nov. 22, 2011.

Abdelmalik Bachir, Mischa Dohler, Senior Member, IEEE, Thomas Watteyne, Member, IEEE, and Kin K. Leung, Fellow, IEEE, MAC Essentials for Wireless Sensor Networks, IEEE Communications Surveys &Tutorials, vol. 12, No. 2, Second Quarter 2010.

European Patent Office, European Search Report issued in corresponding EP Application No. 11160224.9 dated Sep. 8, 2011.

* cited by examiner

The coding and modulation process of the preamble

MAGNETIC FIELD COMMUNICATION METHOD FOR MANAGING NODE WITH LOW POWER CONSUMPTION

CROSS-REFERENCE TO RELATED APPLICATION(S)

This application claims the benefit under 35 U.S.C. §119 (a) of Korean Patent Application No. 10-2010-0029276, filed on Mar. 31, 2010, in the Korean Intellectual Property Office, the entire disclosure of which is incorporated herein by reference for all purposes.

BACKGROUND OF THE INVENTION

1. Technical Field

The following description relates to a magnetic field communication method in low frequency band for managing node with low power consumption which enhances performance and efficiency of a magnetic field area network in the low frequency region.

2. Description of the Related Art

As is generally known, a low frequency band magnetic field area network (MFAN) is a wireless communication network for transmitting and receiving information using magnetic field signal in the low frequency region between 30 KHz and 300 KHz. The center frequency of a wireless communication is 128 KHz and binary phase shift keying (BPSK) is commonly used as a modulation method. Manchester coding and non-return-to-zero level (NRZ-L) coding are used for diversifying data rates, and several Kbps data rate within several meters can be provided.

Meanwhile, devices being participated in a MFAN are classified into two groups according to their role: MFAN coordinator (MFAN-C) and MFAN node (MFAN-N). Only one MFAN-C exists per one MFAN, and the MFAN includes one MFAN-C and a plurality of MFAN-Ns that are connected thereto. MFAN-C manages connection and disconnection of MFAN-Ns. MFAN adopts time division multiple access (TDMA) method. MFAN-C manages connection inside of the MFAN; time resources are distributed according to the judgement of the MFAN-C whenever MFAN-Ns are connected thereto. MFAN technologies described above can be applied to the service areas such as sensor networks, home networks, constructions, transportations, etc.

Figure 1:
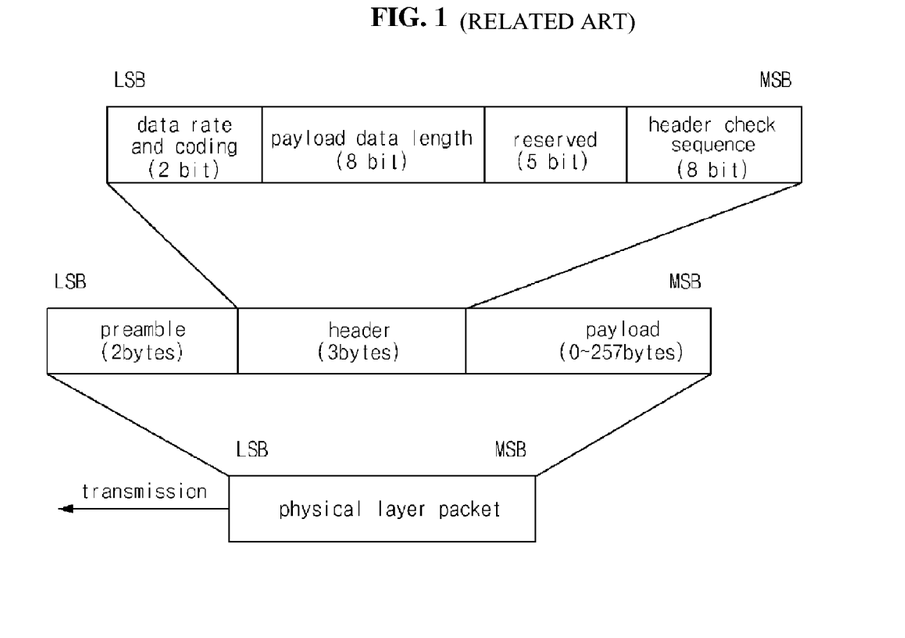
FIG. 1 is an illustration showing a frame format of a physical layer according to a conventional low frequency band MFAN communication method.

In relation to such MFAN, the applicant of the present invention had filed a Korea Patent Application No. 10-2008-131920 entitled "PHY layer of low frequency band based on wireless magnetic field communication (hereinafter referred to as 'prior application"). Above-described prior application suggests a method for configuring a physical layer (PHY) that enables wireless communication by using a variable data rate or selecting an appropriate coding method in accordance with the neighboring environment considering the problems of conventional MFAN wherein efficient communication cannot be performed due to the fixed data rate or the adopted coding method. In the above mentioned prior application, the frame format of the physical layer includes three major elements: a preamble, a header, and a payload. When a packet is transmitted, a preamble is transmitted first followed by transmission of a header, and then a payload is finally transmitted. Transmission is performed from the least significant bit (LSB). The preamble, shown in FIG. 1, performs identical function like a start-of-frame (SOF) field of a conventional general request or response format. Such preamble is sequentially including bits from the LSB to the most significant bit (MSB). For example, it can include sequences whose length is assigned by a user including a 0-bit, 4-bit, 8-bit or 12-bit "0" sequence, a 4-bit "0000" sequence, and a 4-bit "1010" sequence. Eventually, the preamble will include a 4-bit "0000" sequence and a 4-bit "1010" sequence because there may be no user assigned sequence when the user assigned sequence has a 0 bit.

In a conventional low frequency band MFAN communication method, all the MFAN-Ns perform wake-up functions by detecting the carrier frequency transmitted from the MFAN-C.

As described above, according to the conventional low frequency band MFAN communication method, power consumption of the MFAN-N increases since it is awakened by detecting the carrier frequency not by a separate wake-up signal, for example, it is awakened unnecessary and frequently by the carrier frequencies transmitted to the MFAN-C by other MFAN-Ns.

Furthermore, according to the conventional low frequency band MFAN communication method, it has the disadvantage of increasing power consumption since there is no adequate procedure for stopping the operation even though errors are repeatedly occurred during the operation of the MFAN-C.

SUMMARY

In one general aspect, there is provided a magnetic field communication method for managing node with low power consumption that is accomplished in a low-frequency wireless network, including: a magnetic field area network coordinator (MFAN-C) and at least one magnetic field area network node (MFAN-N), wherein physical layer frame includes a preamble, a header and a payload, and wherein the preamble includes a wake-up sequence and a synchronization sequence.

The magnetic field communication method for managing node with low power consumption may include that the wake-up sequence is added only to the preamble of the frame that is being transmitted from the MFAN-C to change the status of MFAN-N from hibernation status to activation status.

The magnetic field communication method for managing node with low power consumption may include that the wake-up sequence is modulated using ASK modulation, and the synchronization sequence is modulated using BPSK modulation.

A computer-readable recording medium may store a program, the program being capable of executing the magnetic field communication method for managing node with low power consumption.

A computer-readable recording medium may store a program, the program being capable of executing the magnetic field communication method for managing node with low power consumption, wherein the wake-up sequence is modulated using ASK modulation, and the synchronization sequence is modulated using BPSK modulation.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, example embodiments of a magnetic field communication method for managing node with low power consumption of the present invention will be described in detail with reference to the accompanying drawings.

Key elements of a MFAN can be classified into temporal elements and physical elements. The temporal elements including a request period, response period, and inactive periods constitute a superframe; the physical elements including a MFAC-C and MFAB-Ns constitute a network. The most basic element of a physical layer is a node. There are two types of nodes: a MFAN-C that controls a network and a MFAN-N that is a constitutional element.

The node to be determined first in a MFAN is a MFAN-C; a superframe begins when the MFAN-C transmits a requested packet within the request period. The MFAN-C performs functions such as: configuration, association, division, and disassociation of the MFANs within the service area; and management of the transmission and reception periods of the MFANs. Since a MFAN can use one channel within the service area, only one network exists. All the other nodes within a MFAN, except the MFAN-C, become MFAN-Ns. Separate connections may be established between the MFAN-C and the MFAN-Ns, that is, MFAN-C and each MFAN-N may make one on one connection; although participating nodes in a MAFN may be classified as either a MFAN-C or a MFAN-N, all the nodes may be capable of performing functions as either a MFAN-C or a MFAN-N.

Figure 2:
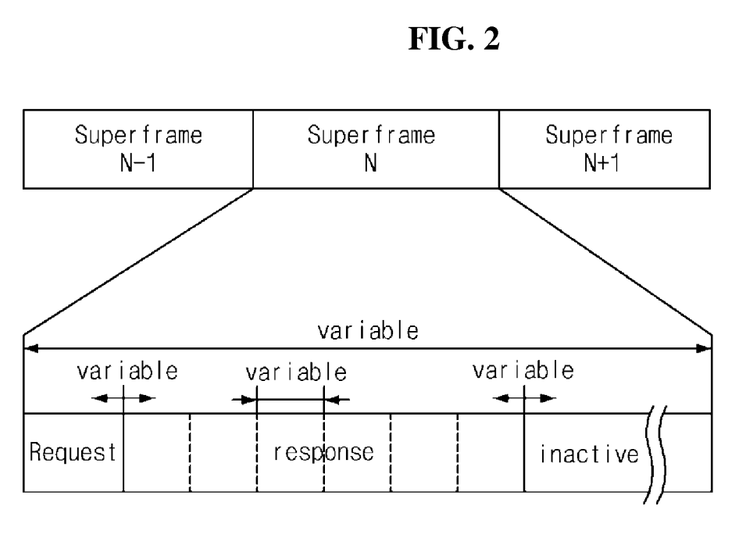
FIG. 2 is an illustration of a superframe structure showing temporal elements of a MFAN.

FIG. 2 illustrates a superframe structure showing temporal elements of a MFAN. The temporal element that can be utilized by the MFAN is a time slot in a time division multiple access (TDMA). The MFAN-C may manage a group of MFAN-Ns that transmits data during response period, and the time slot may be self-managed by the MFAN-Ns within the MFAN of the selected group. The superframe structure of a MFAN, as shown in FIG. 2, includes a request period, a response period, and an inactive period; the lengths of the request period and the response period may be variable. A superframe begins when the MFAN-C transmits a response request packet within the request period. Response request packets may contain information of the MFAN-Ns that are ready to transmit response packets during the response period, and the MFAN-Ns may transmit response packets during the response period using the information contained in the response request packets.

A request period is a time period for transmitting the response request frame containing information of the MFAN-Ns that are ready to transmit response frames during the response period of the MFAN-C.

A response period is a time period allowed for the MFAN-Ns to transmit response frames according to the response request of the MFAN-C; it can be divided into many time slots according to the number of the MFAN-Ns in the MFAN. Each length of the time slot may be variable according to the length of the response frame and the receiving acknowledgement frame. Slot numbers may be decided according to the order of the divided time slots; the MFAN-N that is to be transmitted at each time slot is allocated by the MFAN-C. The MFAN-C may allocate a response period to a specific group for utilization thereof; nodes in the allocated group may automatically transmit data frames during the response period.

An inactive period may begin when there is no node transmitting response packets for a predetermined period of time, wherein nodes can transmit data without request from the MFAN-C. This period maintains until the MFAN-C transmits a request packet.

Figure 3:
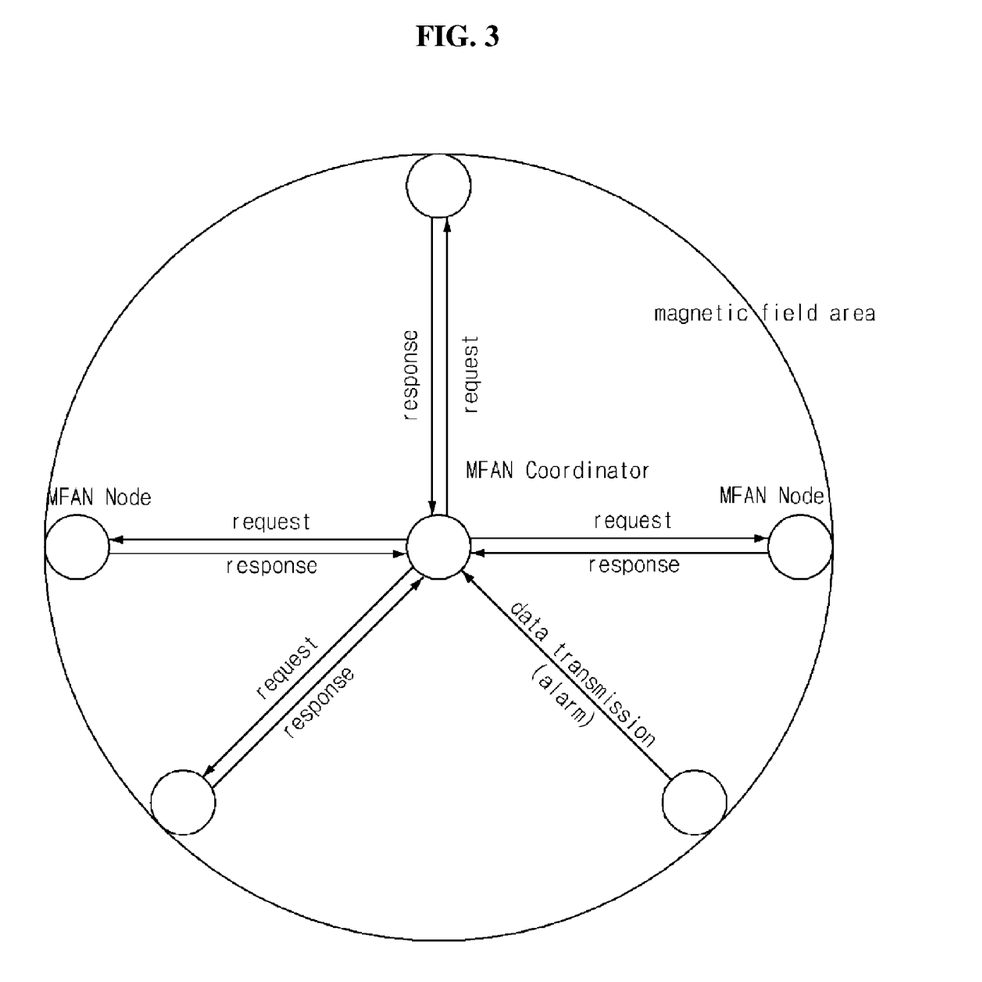
FIG. 3 is an illustration of a network structure showing physical elements of a MFAN.

FIG. 3 illustrates a network structure showing physical elements of a MFAN. The physical elements of the MFAN may be nodes including a MFAN-C and revolving MFAN-Ns therearound in a star topology network. A MFAN is a network capable of data communication between the MFAN-C and each individual MFAN-N revolving therearound; the basic constitutional elements of the MFAN are nodes. The nodes are divided into a MFAN-C and a MFAN-N according to their roles. The MFAN-C may manage all the MFAN-Ns, and there may be only one MFAN-C in a network. The MFAN-C may control the MFAN-Ns by broadcasting the response request packets to all MFAN-Ns simultaneously. The MFAN-N may transmit and receive response packets in accordance with the control of the MFAN-C. In a MFAN, for identification of each MFAN-N, various address systems are used such as: a MFAN ID, a unique identifier (UID), a group address, and a node address, etc.

The MFAN ID is a unique ID for identification of a MFAN and its value may be unique and not overlap with the value of another MFAN's ID; and the value may be maintained as long as the MFAN exists. The UID is a unique identifier including 64-bit and including a group address, an IC manufacturer code, and an IC manufacturer serial number. A MFAN-N may be identified by this UID. The group address is an identifier for a classified group of MFAN-Ns; it may be utilized in a method for minimizing collision since data transmission request can be performed by group unit when transmitting packets; it may have values of 0x00 to 0x2F. The node address is an identifier to distinguish between the nodes in stead of the UID; it may be a 16-bit address that is allocated by the MFAN-C when a network association is carried out.

Figure 4:
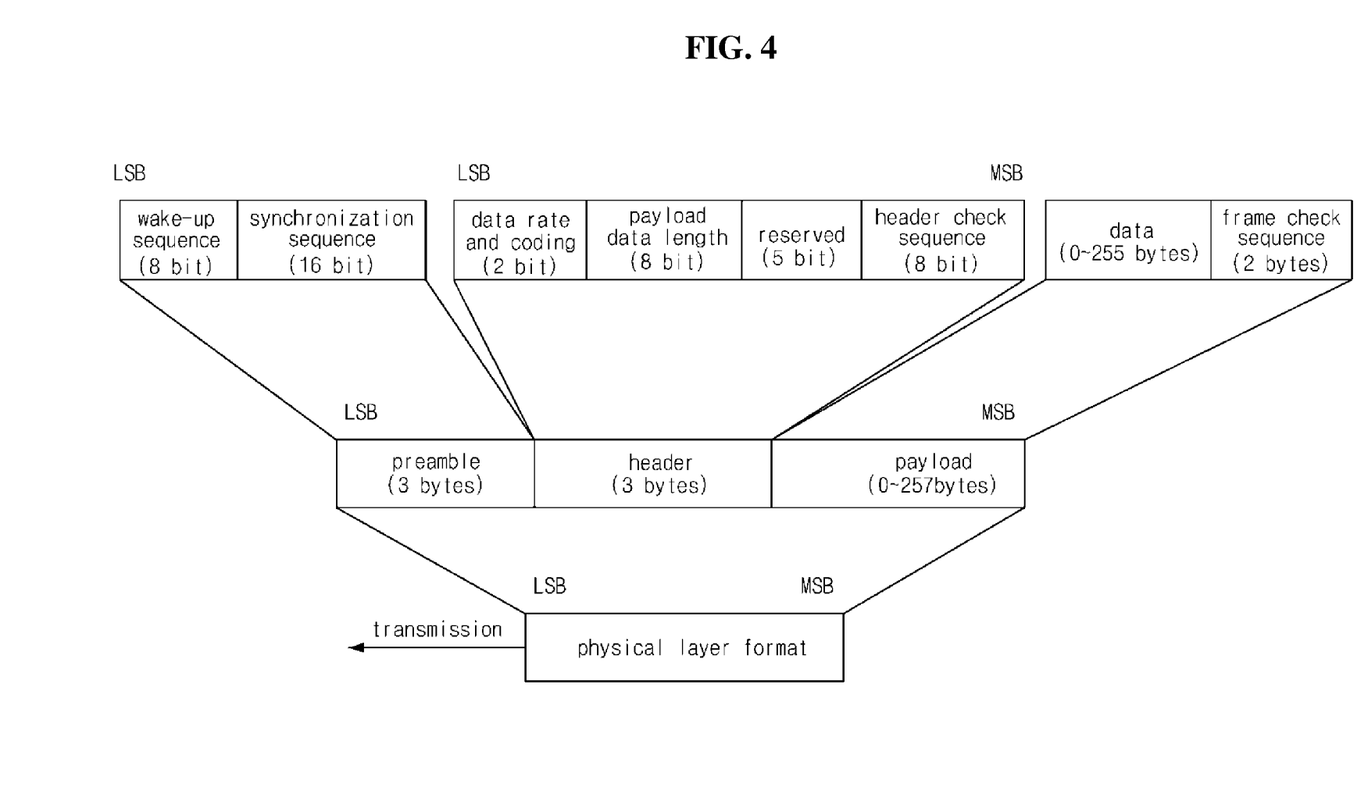
FIG. 4 is an illustration of a physical layer frame format according to the magnetic field communication method for managing node with low power consumption of the present invention.

FIG. 4 is an illustration of a physical layer frame format according to an embodiment of the magnetic field communication method for managing node with low power consumption. As shown in FIG. 4, each physical layer frame according to a MFAN of an embodiment includes three elements as those of a conventional MFAN: a preamble, a header, and a payload. When a packet is transmitted, a preamble may be transmitted first followed by transmission of a header, and then a payload may be finally transmitted. Transmission may be performed from the least significant bit (LSB).

Figure 5:
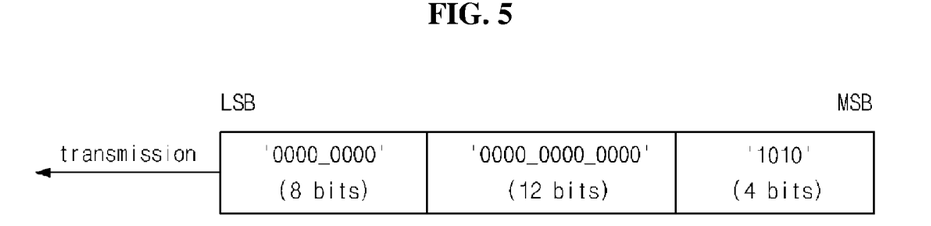
FIG. 5 is an illustration of a preamble format of a physical layer according to the MFAN of the present invention.

FIG. 5 is a preamble format of a physical layer according to the MFAN of an embodiment. As shown in FIG. 5, the preamble of an embodiment, unlike a conventional preamble, may include two parts: a wake-up sequence including [0000_0000] 8-bit, and a synchronization sequence including [0000_0000_0000] 12-bit and a [1010] 4-bit. In the above-described configuration, the wake-up sequence may exist only when the MFAN-C wants the MFAN-Ns to enter into an active status from the hibernation mode described later. Here, the wake-up sequence may be added only to the preamble of the physical layer frame transmitted from the MFAN-C to change a status of an MFAN-N from a hibernation status to an activation status, as discussed later referring to FIG. 10. The synchronization sequence may be used for packet recognition, symbol timing, and carrier frequency estimation. The preamble may be encoded by TYPE 0 method as defined in Table 2.

As shown in FIG. 4, the header may include two data regions including the data rate and coding, the payload length, and the 8-bit header check sequence; the results are summarized in Table 1. When the header is transmitted from the LSB, the LSB of the data rate and coding may be transferred first, and the MSB of the header check sequence is transferred later. The header may be encoded by TYPE 0 method as defined in Table 2.

TABLE 1

| | | |
|---|---|---|
| b2-b0 | data rate and coding | 3-bit value represents data rate and coding method of the Table 2. |
| b10-b3 | payload data length | 8-bit value represents data length of the payload in bytes. MSB is b10 and LSB is b3. |
| b15-b11 | reserved | reserved for usage. |
| b23-b16 | header check sequence | including 8-bit cyclic remainder codes. |

There may be eight defined methods for the data rate and coding and they may be expressed by 3 bits as summarized in Table 2.

TABLE 2

| bit (b2 b1 b0) | data rate and coding |
|---|---|
| 000 | TYPE 0 |
| 001 | TYPE 1 |
| 010 | TYPE 2 |
| 011 | TYPE 3 |
| 100 | TYPE 4 |
| 101 | TYPE 5 |
| 110 | TYPE 6 |
| 111 | TYPE 7 |

According to an embodiment, unlike the conventional method, different modulation schemes may be used in modulation of the wake-up sequence and the synchronization sequence of the preamble. In other words, ASK modulation may be used for the wake-up sequence while BPSK modulation may be used for the synchronization sequence.

Figure 6:
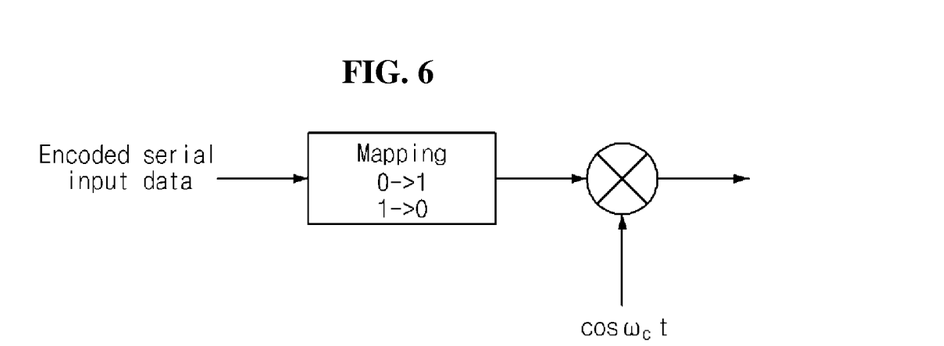
FIG. 6 is an illustration to explain an ASK modulation method.

FIG. 6 is an illustration to explain an ASK modulation method. As shown in FIG. 6, the encoded serial input data may be converted to a number representing one of the two ASK constellation points wherein $\omega_c=2\pi f\_c$ and $f\_c$ is the carrier frequency of the MFAN.

Figure 7:
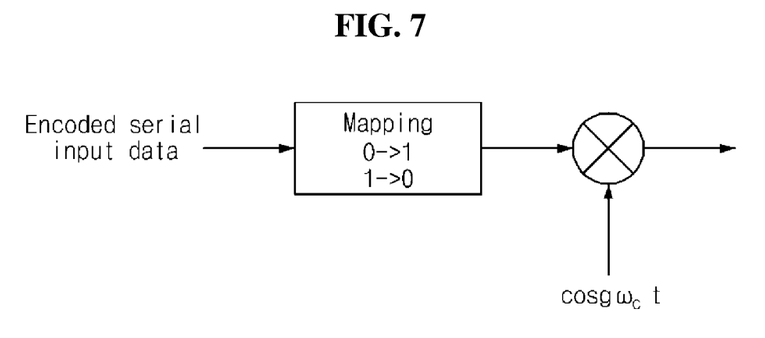
FIG. 7 is an illustration to explain a BPSK modulation method.

FIG. 7 is an illustration to explain a BPSK modulation method. As shown in FIG. 7, the encoded serial input data may be converted to a number representing one of the two BPSK constellation points wherein $\omega_c=2\pi f\_c$ and $f\_c$ is the carrier frequency of the MFAN.

Figure 8:
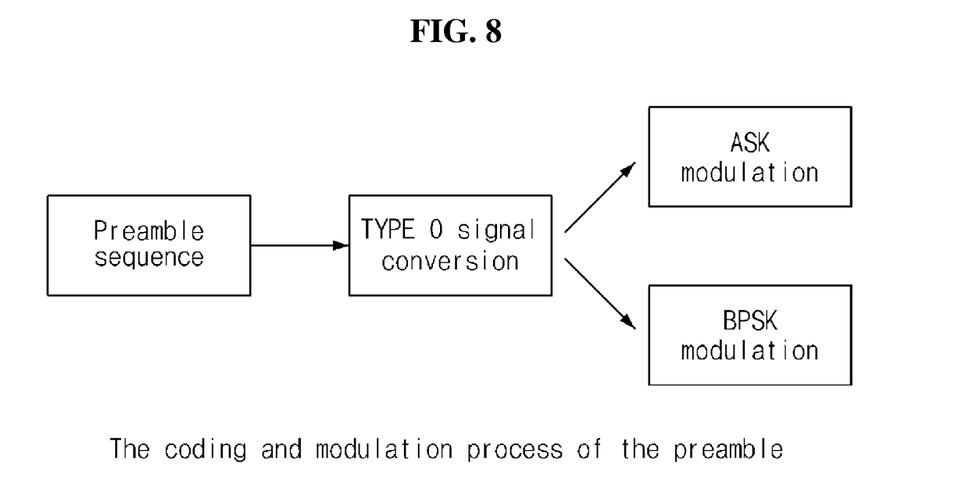
FIG. 8 is an illustration to explain coding and modulation method of a preamble according to the magnetic field communication method for managing node with low power consumption of the present invention.

FIG. 8 is an illustration to explain coding and modulation method of a preamble according to the magnetic field communication method for managing node with low power consumption of an embodiment. As shown in FIG. 8, after the preamble sequence is encoded using TYPE 0, ASK modulation may be used for the wake-up sequence while BPSK modulation may be used for the synchronization sequence. One reason for using ASK modulation for the wake-up sequence is to easily distinguish a wake-up signal with low power consumption. In other words, if BPSK modulation is used for the wake-up sequence, an internal phase detection circuit block may be driven for the MFAN-Ns to detect the wake-up sequence resulting in an increase in power consumption. However, if ASK modulation is used for the wake-up sequence, by using the amplitude of the signal a wake-up sequence may be easily detected without driving an internal phase detection circuit block, hence less power consumption may be expected.

Status transition diagrams of the MFAN-C and the MFAN-Ns will be described in accordance with the magnetic field communication method for managing node with low power consumption of an embodiment.

Figure 9:
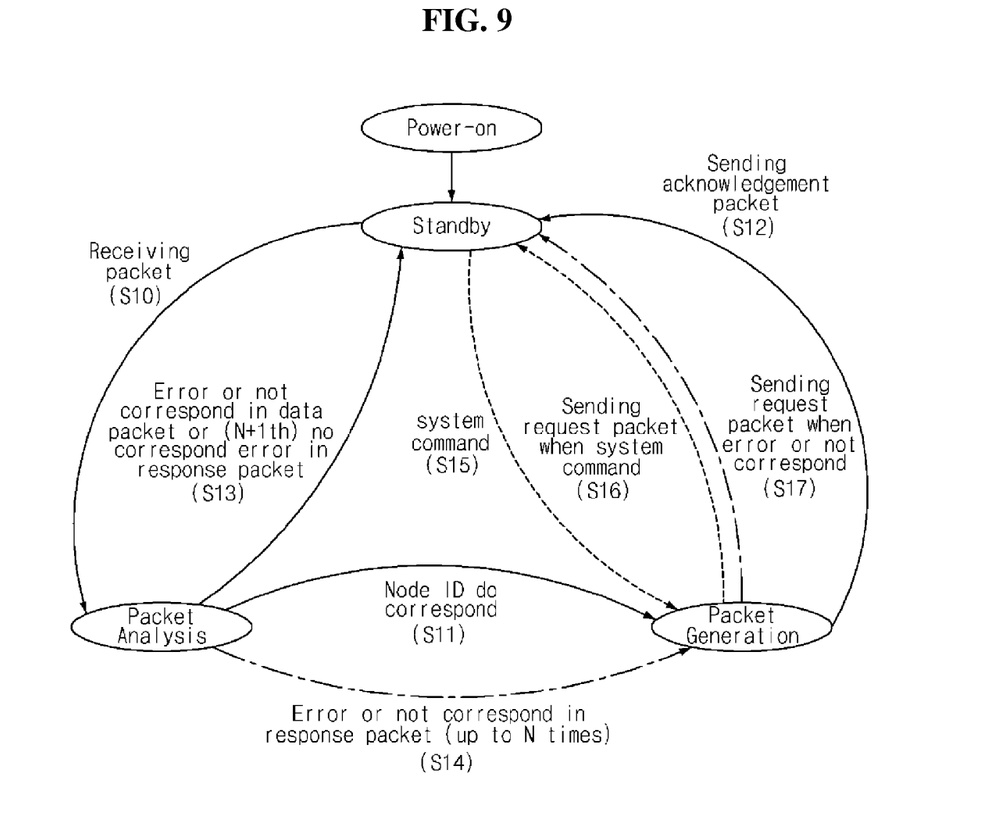
FIG. 9 is a diagram showing status transitions of a MFAN-C according to the magnetic field communication method for managing node with low power consumption of the present invention.

FIG. 9 is a status transition diagram of a MFAN-C according to the magnetic field communication method for managing node with low power consumption of an embodiment. As shown in FIG. 9, the standby status of the MFAN-C, which may be sustained during carrier detection period, may transform into the packet analysis status at the moment when the MFAN-C receives packets from the MFAN-Ns (S10). At this time, if the node ID and the destination address of the received data packet are identical, the status of the MFAN-C may transform into the packet generation status (S11) and may generate a data receiving acknowledgement (DA) packet, then this DA packet is transmitted to the MFAN-N. After completion of above-described process, the status of the MFAN-C may return to the standby status (S12).

Meanwhile, in the packet analysis status, if the node ID of the MFAN-C does not match with the destination address of the received data packet or an error occurs in the data packet, the MFAN-C may immediately return to the standby status (S13). In the packet analysis status, if an error occurs in a received response packet or the node ID of the MFAN-C does not match with the destination address of the received response packet, the MFAN-C may regenerate a response request (SQ) packet in the packet generation status and may retransmit this SQ packet to the MFAN-N. If such errors continuously occur, the process may be repeated required number of times (e.g., with a maximum of N times), for example, three times (S14), as specified in the procedure of the packet analysis status. In this status, if the number of repeated process reaches N+1 the MFAN-C may return to the standby status (S13) from the packet analysis status concluding that more repetition of retransmitting the SQ packet is meaningless.

Meanwhile, if the MFAN-C receives a certain system command from higher level systems, it may return to packet generation status (S15) from the standby status and transmits corresponding request packet, then may return to the standby status (S16). In this status, if an error occurs in the system command or the node ID of the MFAN-C does not match with the destination address of the system command, the MFAN-C may return to the standby status (S17) after transmitting the SQ packet.

Figure 10:
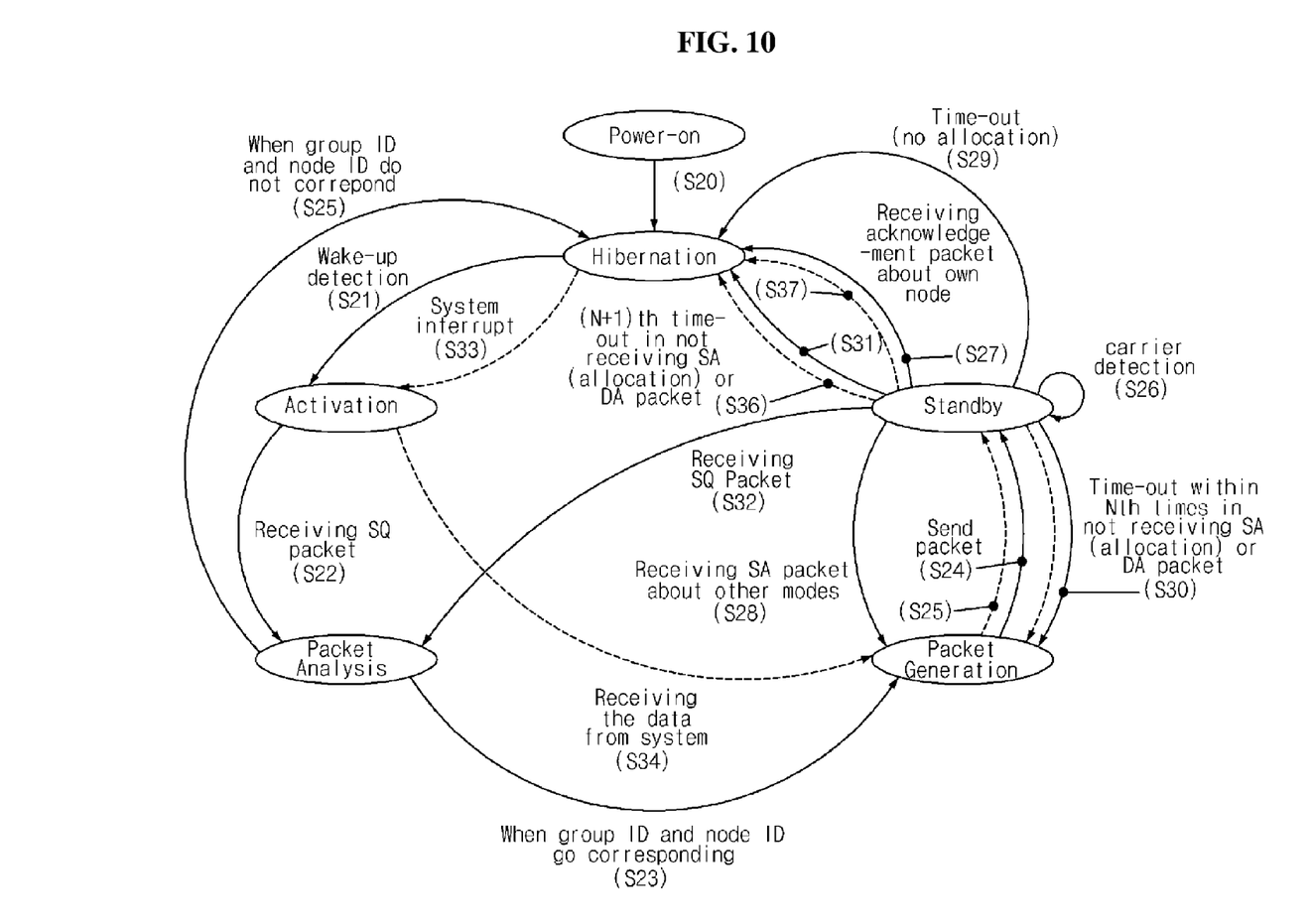
FIG. 10 is a diagram showing status transitions of a MFAN-N according to the magnetic field communication method for managing node with low power consumption of the present invention.

FIG. 10 is a diagram showing status transitions of a MFAN-N according to the magnetic field communication method for managing node with low power consumption of an embodiment. As shown in FIG. 10, all the MFAN-Ns may continuously check a carrier. When the power is on, the MFAN-Ns may enter into the hibernation status (S20). In this status, if a wake-up signal (sequence) is detected, the MFAN-N may transform into the activation status (S21). In this status, if a SQ packet is received, the MFAN-N may enter into the packet analysis status to analyze received SQ packet.

At this time, if the destination address of the SQ packet, the group ID and the node ID of the MFAN-N may be matched, the status of the MFAN-N may transform into the packet generation status (S23) and may transmit the response packet to the MFAN-C, then may transform into the standby status (S24). But if the destination address of the SQ packet, the group ID, and the node ID of the MFAN-N do not match, the MFAN-N may immediately return to the hibernation status (S25). If the MFAN-N receives a response acknowledgement (SA) packet for its own node during the carrier detection (S26) process in the standby status, the MFAN-N may return to the hibernation status (S27); but if it receives a response acknowledgement (SA) packet for the other node, it may transform into the packet generation status (S28).

If the time-out period is exceeded without allocation of a slot number in the standby status, the MFAN-N may immediately return to the hibernation status (S29). However, if a slot number is allocated, the MFAN-N may transform into the packet generation status (S30), and may generate and retransmits the response packet until the number of the consecutive elapsed time-out period reaches maximum N. In the standby status, if the number of the consecutive elapsed time-out period reaches N+1, the MFAN-N may return to the hibernation status (S31) to reduce power consumption concluding that more repeated regeneration of the response packet is meaningless. In the standby status, if the MFAN-N receives a SQ packet during the carrier detection process, it may transform into the packet analysis status (S32). Meanwhile, if a system interrupt occurs, the MFAN-N may transform into the activation status (S33) from the hibernation status. In this case, if the MFAN-N receives data from the system, it may transform into the packet generation status (S34) and generate a data packet, and then may transmit the data packet to the MFAN-C; later it may transform into the standby status (S35) from the packet generation status. In this status, if the MFAN-N receives a DA packet, the MFAN-N may return into the hibernation status (S36).

If no DA packet is received during the time-out period, MFAN-N may regenerate and retransmit the data packet to the MFAN-C, then it may transform into the standby status (S37) from the packet generation status; if the above-described case, in which no DA packet is received until the time-out period is elapsed, occurs consecutively, the process may be repeated required number of times (e.g., a maximum of N times), for example, three times, as specified in the procedure of the packet generation status. When the number of repeated process reaches N+1 the MFAN-N may return to the hibernation status (S38) from the standby status.

ABBREVIATIONS AND DEFINITIONS

AQ: association request
AS: association response
ASA: association response acknowledgement
ASC: association status check
ASQ: association status request
ASS: association status response
ASSA: association status response acknowledgement
DA: data receiving acknowledgement
DAQ: disassociation request
DAS: disassociation response
DASA: disassociation response acknowledgement
DQ: data request
DS: data response
DSA: data response acknowledgement
LSB: least significant bit
MFAN: Magnetic Field Area Network)
MFAN-C: Magnetic Field Area Network Coordinator
MFAN-N: Magnetic Field Area Network Nod
SA: response acknowledgement
SQ: response request
UID: unique identifier The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A magnetic field communication method, the method comprising:
    providing a network comprising a magnetic field area network coordinator (MFAN-C) and at least one magnetic field area network node (MFAN-N); and
    transmitting a plurality of data frames used to manage the at least one MFAN-N from the MFAN-C to the at least one MFAN-N,
    wherein at least one of the plurality of data frames comprises a preamble, a header and a payload,
    wherein the preamble comprises a wake-up sequence and a synchronization sequence, and
    wherein the wake-up sequence, which changes a status of the at least one MFAN-N from a hibernation status to an activation status, is included only in the preamble of the at least one data frame transmitted from the MFAN-C.

2. The magnetic field communication method of claim 1, wherein the wake-up sequence is modulated using amplitude shift keying (ASK) modulation, and the synchronization sequence is modulated using binary phase shift keying (BPSK) modulation.

3. The magnetic field communication method of claim 1, wherein the wake-up sequence is included only in the at least one data frame transmitted from the MFAN-C to the at least one MFAN-N to place the at least one MFAN-N on an activation status, and wherein the at least one MFAN-N is not placed on the activation status by detecting a signal transmitted from another MFAN-N to the MFAN-C.

4. A non-transitory computer-readable recording medium having recorded thereon a program for executing a magnetic field communication method, the method comprising:

providing a network comprising a magnetic field area network coordinator (MFAN-C) and at least one magnetic field area network node (MFAN-N); and transmitting a plurality of data frames used to manage the at least one MFAN-N from the MFAN-C to the at least one MFAN-N, wherein at least one of the plurality of data frames comprises a preamble, a header and a payload, wherein the preamble comprises a wake-up sequence and a synchronization sequence, and wherein the wake-up sequence, which changes a status of the at least one MFAN-N from a hibernation status to an activation status, is included only in the preamble of the at least one data frame transmitted from the MFAN-C.

5. The non-transitory computer-readable recording medium of claim 4, wherein the wake-up sequence, which changes a status of the at least one MFAN-N from a hibernation status to an activation status, is included only in the preamble of the at least one data frame transmitted from the MFAN-C, and wherein the wake-up sequence is modulated using amplitude shift keying (ASK) modulation, and the synchronization sequence is modulated using binary phase shift keying (BPSK) modulation.

* * * * *